United States Patent [19]
Randall

[11] 3,914,362
[45] Oct. 21, 1975

[54] METHOD FOR PRODUCING MULTICOLOR PATTERNS IN SYNTHETIC PLASTIC SHEET MATERIAL

[75] Inventor: Robert E. Randall, Kensington, Conn.

[73] Assignee: Rowland Products, Inc., Kensington, Conn.

[22] Filed: Oct. 31, 1973

[21] Appl. No.: 411,302

Related U.S. Application Data

[62] Division of Ser. No. 273,732, July 21, 1972, Pat. No. 3,792,945.

[52] U.S. Cl. .................. 264/75; 161/55; 264/171; 264/211; 264/245
[51] Int. Cl. ........................... B29f 1/12; B29f 3/12
[58] Field of Search ............ 264/75, 245, 171, 211; 425/131, 224; 161/55

[56] References Cited
UNITED STATES PATENTS

| | | | |
|---|---|---|---|
| 2,803,041 | 8/1957 | Hill et al. | 264/75 |
| 3,422,175 | 1/1969 | Rowland | 264/75 |
| 3,471,898 | 10/1969 | Krystof | 425/131 |
| 3,473,193 | 10/1969 | Quackenbush et al. | 425/131 |
| 3,513,060 | 5/1970 | Krystof | 264/245 |
| 3,531,828 | 10/1970 | Nauta | 264/75 |
| 3,664,789 | 5/1972 | Gibney | 264/245 |
| 3,778,207 | 12/1973 | Luraschi | 425/131 |

*Primary Examiner*—Jeffery R. Thurlow

[57] ABSTRACT

There is disclosed a method for extruding synthetic plastic sheet material having differentially colored bands which utilizes an extrusion die block having a chamber in which is disposed a pair of sleeve members. The matrix resin is supplied to the die block chamber on the opposite side of the die chamber from the extrusion orifice and the differentially colored resin is supplied to the sleeve members. Each of the sleeve members has a pair of bores therein, one of which receives the differentially colored resin and communicates with the other which in turn has discharge openings in the surface thereof adjacent the extrusion orifice. The sleeve members are spaced apart so as to provide a channel therebetween and are spaced from the walls of the die chamber so as to provide channels thereabout whereby matrix resin will flow both between and about the sleeve members while resin is discharged intermittently through the sleeve members. The matrix resin flows towards the discharge openings from the sleeve members and encapsulates the differentially colored resin issuing therefrom.

The intermittent discharge means may be operated in different directions so as to provide a basketweave design, bands of color at right angles to each other and the like. Three extruders may be utilized to provide two color bands with different colors being supplied to each of the sleeve members.

9 Claims, 15 Drawing Figures

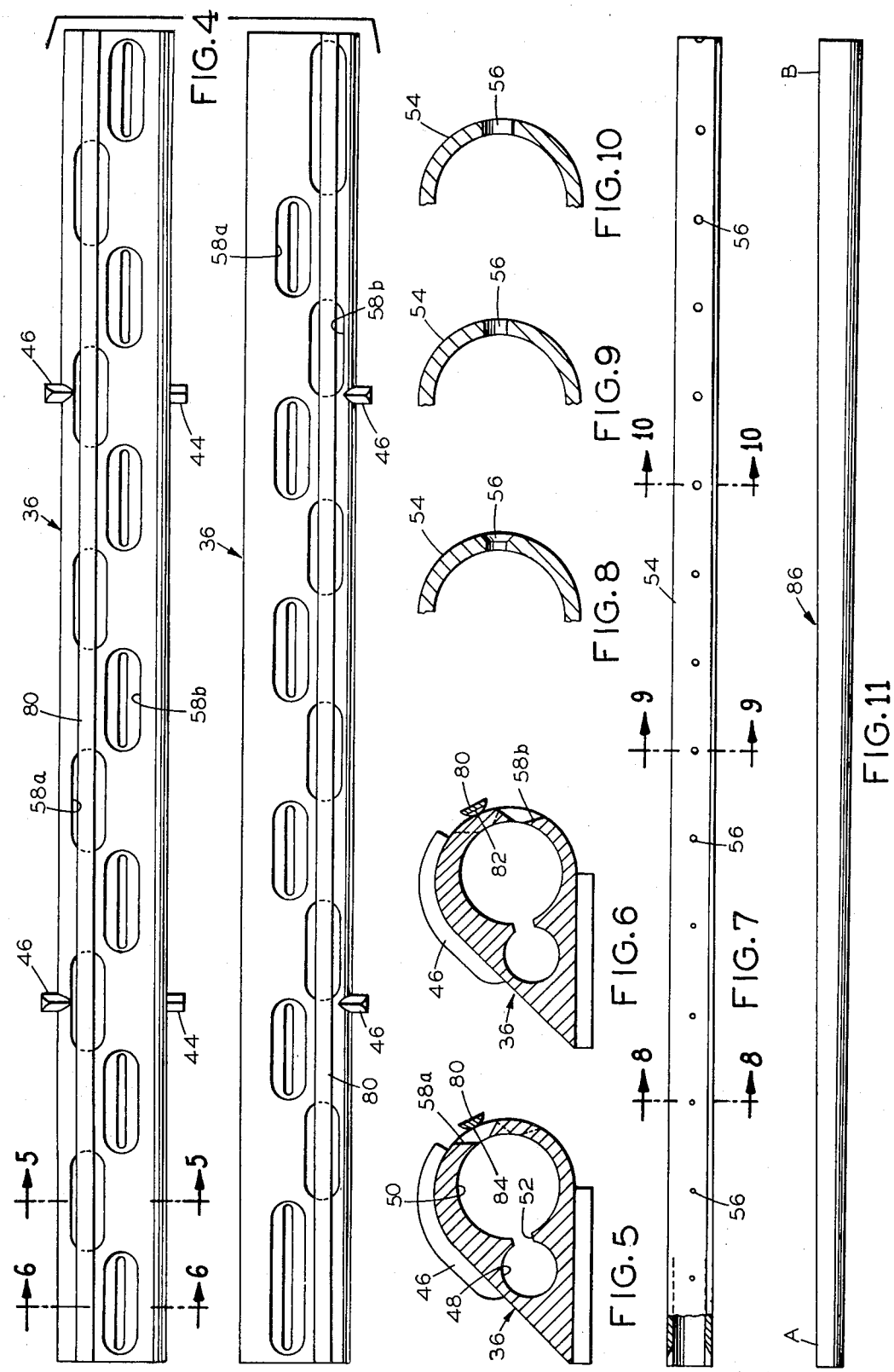

METHOD FOR PRODUCING MULTICOLOR PATTERNS IN SYNTHETIC PLASTIC SHEET MATERIAL

CROSS - REFERENCE TO RELATED APPLICATION

This application is a division of my copending application Ser. No. 273,732 filed July 21, 1972, now U.S. letters Pat. No. 3,792,945 granted Feb. 19, 1974.

BACKGROUND OF THE INVENTION

For more than a decade, there has been considerable effort devoted to the producing of synthetic thermoplastic sheet material having differentially colored bands or layers therein. The materials originally developed employing differentially colored bands are of the type illustrated in U.S. Pat. No. 2,985,556 granted May 23, 1961 to William P. Rowland and it can be seen that the bands of the differentially colored material extended in a direction generally parallel to the direction of extrusion. Other techniques for introducing differentially colored material in the body of the extruded sheet are shown in U.S. Pat. No. 2,632,204 to Murray and U.S. Pat. No. 2,803,041 to Hill et al.

For some applications, it is extremely desirable that the differentially colored materials not extend in a parallel pattern to the direction of the extrusion and this is particularly so in the optical frame industry wherein patterns of varying appearance are constantly desired. Various techniques have been proposed to provide interruption in an otherwise parallel pattern for the differentially colored material, among which is that illustrated in U.S. Pat. No. 3,274,646 to Krystof. Techniques for producing unusual multilayered and swirl patterns are described in U.S. Pat. No. 3,443,278 and U.S. Pat. No. 3,531,828 to Jan P. Nauta and U.S. Pat. No. 3,422,175 to William P. Rowland.

One of the most popular patterns over the past years has been a Havana pattern which effectively comprises a basketweave design wherein differentially colored material from a crosshead extruder is discharged from two series of vertically spaced ports fed intermittently by means of screws or the like. Such designs have proven quite popular but there have been very serious limitations as to the width of the sheet material which could be produced thereby due to the problems of maintaining adequate even flow of resin across the series of small ports employed.

In addition, there have been problems in maintaining reasonably distinct of the differentially colored material because of the tendency toward smearing as the streams of differentially colored resin and matrix resin meet and blend together.

It is an object of the present invention to provide a novel method for producing multibanded patterns of differentially colored resin disposed within a matrix resin and in which the bands of differentially colored material are of substantially uniform intensity and dimension throughout the width of the sheet material.

It is also an object to provide such method in which the bands of differentially colored resin are relatively distinct and substantially free from smearing.

Another object is to provide such method wherein two differentially colored resins may be utilized to provide the bands for a three color sheet material.

Still another object is to provide such a method in which the differentially colored bands may cross at substantially right angles.

SUMMARY OF THE INVENTION

It has now been found that the foregoing and related objects may be readily obtained by the method of the present invention wherein an elongated die chamber is provided having an extrusion orifice and a discharge passage communicating therebetween and fluid synthetic thermoplastic resin is supplied to the die chamber at a point spaced from the discharge passage. Differentially colored fluid synthetic thermoplastic resin is supplied at a multiplicity of points in the die chamber spaced along the length thereof and between the point of supply of the first mentioned fluid synthetic plastic resin and the discharge passage. These points are spaced both above and below the center line of the die chamber, and the resin is supplied intermittently at the spaced points to produce pulses of color.

The flow of differentially colored resin to the spaced points is controlled to provide substantially uniform amounts thereto along the length thereof, and the first mentioned resin is caused to flow above and below the spaced points of introduction of the differentially colored resin and to flow towards the points of supply to encapsulate the differentially colored resin at the points of supply. The resultant composite stream is extruded and has the differentially colored synthetic thermoplastic resin encapsulated within a matrix of the first mentioned synthetic thermoplastic resin, and the differentially colored synthetic thermoplastic resin provides intersecting bands of differential color along the length of the extruded composite stream.

In one embodiment of the method, the points of supply of the differentially colored fluid synthetic thermoplastic resin are helically moved a limited distance along the lenght of the die chamber. The direction of helical movement of the points of introdcution above the center line of the die chamber may be opposite to the direction of helical movement of the points below the center line of the die chamber, or the same. The speed of helical movement of the points of introduction above the center line of the die chamber may differ from the speed of the helical movement of the points below the center line of the die chamber. The differentially colored fluid synthetic thermoplastic resin supplied at the points above the center line may be a first differential color and that supplied below the center line may be of a second differential color, thereby producing a three-color synthetic plastic material having intersecting bands of two different colors.

The differentially colored extruded thermoplastic sheet material comprises a matrix of synthetic thermoplastic resin and a multiplicity of bands of differentially colored thermoplastic resin encapsulated therein. Some of the bands extend angularly to others of the bands so as to intersect therewith and provide a grid pattern. The bands of one angular orientation are disposed at a depth within the matrix resin different from that of the other angular orientation and a multiplicity of bands of each orientation is provided across the width of the sheet material. The bands are substantially uniform in volume or area across the width of the sheet material and substantially free from smearing.

As has been indicated previously the grid pattern can be varied to produce different angular arrangements of the intersecting bands and two differentially colored resins can be utilized to produce intersecting bands of different colors.

The present invention is advantageously employed with various synthetic thermoplastic materials such as cellulose acetate and cellulose acetate/butyrate. Various dyes and pigments may be used to provide color or varying density of coloration to one or both plastic streams to achieve the visual differentiation in color, refraction or transparency.

The term "differentially colored" material is intended to encompass materials which are visually distinguishable from the material of the body of the sheet to provide a visual pattern effect including the use of colors or substantial lack of color distinct from that of the body of the sheet and the use of the same color but having distinct optical properties as to produce variation in light refraction or transmission with resultant visual pattern effect.

BRIEF DESCRIPTION OF THE DRAWINGS

FIG. 4 is a front elevational view of only the sleeve members and restrictor bars in the die block assembly of FIGS. 1–3 drawn to a scale somewhat enlarged from that of FIG. 2;

FIG. 5 is a sectional view along the line 5—5 of FIG. 4 and to a somewhat enlarged scale;

FIG. 6 is a similar sectional view along the line 6—6 of FIG. 4;

FIG. 7 is a front elevational view of the pressure compensating means utilized in the feed bore of the embodiment of FIGS. 2 and 3 with a portion thereof partially in section to reveal internal configuration;

FIG. 8 is a sectional view to a greatly enlarged scale of the pressure compensating means of FIG. 7 along the line 8—8 of FIG. 7;

FIG. 9 is a similar sectional view along the line 9—9 of FIG. 7 showing the increased size of the orifice;

FIG. 10 is a similar sectional view along the line 10—10 of FIG. 7 to show the further increased size of the orifice;

FIG. 11 is a front elevational view of an alternative embodiment of pressure compensating means for placement in the feed bore;

DETAILED DESCRIPTION OF THE ILLUSTRATED EMBODIMENT

Figure 1:
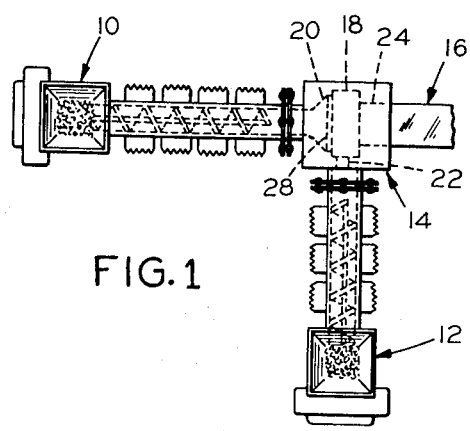
FIG. 1 is a plan view of an extruder assembly for practicing the present invention with the sheet material issuing therefrom fragmentarily illustrated.
Figure 13:
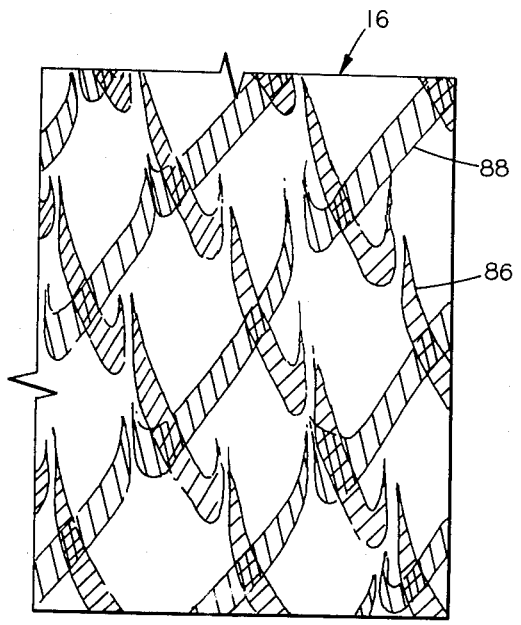
FIG. 13 is a plan view of sheet material produced in accordance with the present invention and employing the so-called Havana pattern.
Figure 14:
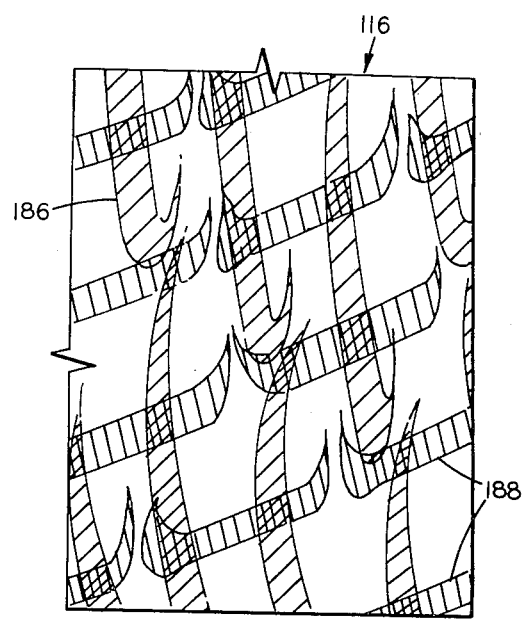
FIG. 14 is a fragmentary view thereof to a greatly enlarged scale along a section conversely thereof.

Turning now in detail to FIGS. 1–10 of the attached drawings, therein illustrated is an extruder assembly for producing a differentially colored synthetic plastic sheet material having spaced bands of a second color at two depths within the matrix of a first color and especially adapted to produce a "Havana pattern" illustrated in FIGS. 13 and 14. As seen in FIG. 1, an extruder assembly includes a main or matrix extruder generally designated by the numeral 10, a crosshead extruder generally designated by the numeral 12 and a die block assembly generally designated by the numeral 14 with the sheet material produced thereby being generally designated by the numeral 16.

Figure 2:
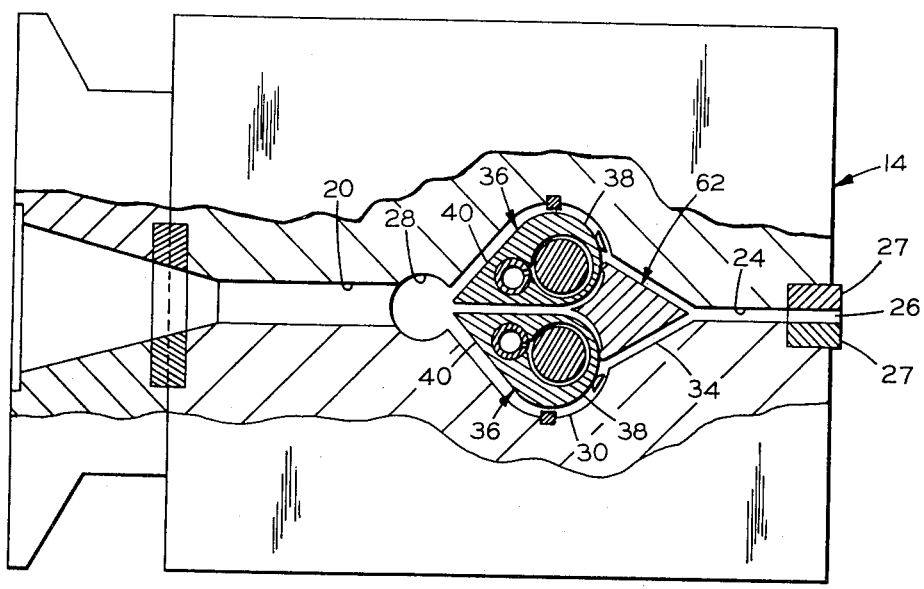
FIG. 2 is a side elevational view of the die block assembly of the apparatus in FIG. 1 drawn to a greatly enlarged scale and with portions thereof in section to show internal construction.

The die block of the assembly 14 has a large chamber therein generally designated by the numeral 18, a first feed conduit 20 from the main extruder 10 and a second feed conduit 22 from the crosshead extruder 12. A discharge passage 24 extends from the chamber 18 to the extrusion orifice 26 (seen in FIG. 2) which is provided in the surface of the die block opposite that having the feed conduit 20. As also seen in FIG. 2, the dimension of the extrusion orifice 26 is controlled by the die lips 27 which may be adjusted by adjusting bolts (not shown). For purposes of clarity, illustration of heat exchange conduits, thermocouples, adjusting screws, drive mechanism for the screws and the like has been omitted.

Figure 3:
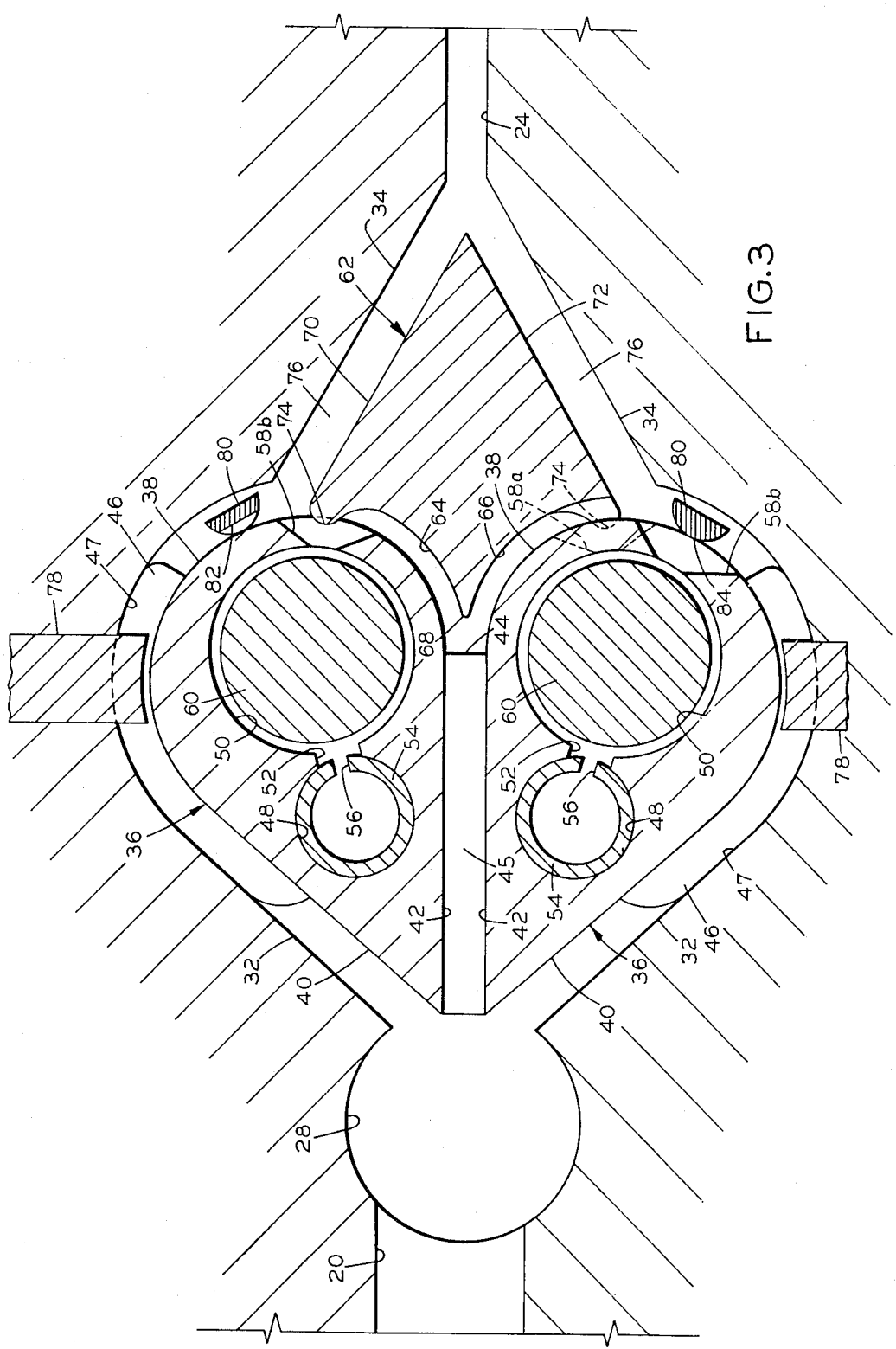
FIG. 3 is a fragmentary sectional view of the die block assembly to a still further enlarged scale.

As best seen in FIGS. 2 and 3, the feed conduit 20 opens into an enlarged manifold 28 of circular cross section extending across the length of the die chamber 18 so as to supply resin from the extruder 10 across the entire length thereof. The die chamber 18 is of generally pear-shaped cross section to provide a streamlined, non-circular configuration with a large central portion 30 of curvillinear, non-circular cross section with generally rectilinear trailing surfaces 32 extending from the manifold 28 and blending smoothly thereinto. Similarly, the die chamber 18 has generally rectilinear leading surfaces 34 extending from the curvilinear central portion 30 to the discharge passage 24.

Seated within the die chamber 18 are a pair of sleeves generally designated by the numeral 36 and of streamlined, generally tear shaped cross section. As can be seen, the sleeves 36 have a curvilinear leading surface 38 which cooperate with the curvilinear central portion 30 of the die chamber 18, and generally rectilinear outer trailing surfaces 40 which cooperate with the rectilinear trailing surfaces 32 of the die chamber 18 so as to provide a passage of relatively uniform spacing therebetween. The sleeves 36 have generally rectilinear opposed surfaces 42 and are spaced apart by spacing ribs 44 to provide a channel 45 therebetween aligned with the feed conduit 20 and the discharge passage 24. The sleeves 36 also spaced from the walls of the die chamber 18 by spacing ribs 46 on the outer surfaces thereof to provide channels 47 therebetween.

Each of the sleeves 36 has a relatively small diameter circular bore 48 in the trailing portion thereof and a relatively large diameter bore 50 in the leading portion thereof, and the two bores communicate through a feed passage 52. The small bore 48 comprises the feed bore and is in communication with the feed conduit 22; it has disposed therewithin a pressure compensating tube 54 which is provided with a multiplicity of circular apertures 56 along its length as best seen in FIGS. 7–10. The diameter of the circular apertures 56 increases from the inlet end of the bore 48 to the end so that there is less restricted flow of the resin therethrough as the pressure drops along the length of the bore 48 with increasing distance from the feed conduit 22.

As best seen in FIGS. 4–6, the sleeves 36 each have two rows of staggered, elongated slot-like discharge openings 58a and 58b which have outwardly diverging sidewalls and through which the resin passes. Rotatably seated in the large diameter bores 50 are metering screws 60 with helical lands (not shown) which alternately discharge resin through the adjacent staggered discharge openings 58a, 58b of the two rows as the lands rotate thereby, thus producing intermittent and alternate discharge through the adjacent staggered openings of the two rows. The screws 60 are driven by suitable drive means (not shown) which is connected thereto outwardly of the die block 14.

Seated within the leading end of the die chamber is a flow diverter generally designated by the numeral 62 which has a streamlined configuration conforming to the adjacent surfaces of the die chamber 18 and sleeves 36. The leading surfaces thereof 70, 72 are rectilinear and extend generally parallel to the rectilinear leading surfaces 34 of the die chamber 18. The trailing portion thereof is substantially defined by a pair of concavely arcuate surfaces 64, 66 which intersect at a land 68 projecting into the channel 45 between the sleeves 36. Curvilinear lobes 74 serving as flow diverter members project at spaced points along the upper and lower ends of the flow diverter 62 into the discharge openings 58b of the upper sleeve 36 and discharge openings 58a of the lower sleeve 36, as viewed in FIGS. 2 and 3 of the appended drawings.

The flow diverter 62 is positioned within the die chamber 18 by suitable means on the ends thereof (not shown) mounted within the die block 14. For ease of fabrication, the flow diverter 62 is initially constructed with a cross section including the lobes 74 along its entire length and thereafter portions of the metal providing the lobes 74 are machined away to correspond to the portions of the sleeves 36 between the discharge openings 58, thus enabling flow of matrix resin about the sleeves 36 in all areas along the length thereof.

Diverter bars generally designated by the numeral 80 are provided in allignment with the other row of discharge openings 58 in the sleeve 36. As best seen in FIGS. 5 and 6, the diverter bars have a convex surface extending toward the discharge openings 58 to provide lobes 84 in the areas thereof and they are machined to provide flats 82 therebetween in the solid areas of the sleeves 36 so as to permit flow of resin therebetween.

In addition, to encourage flow of matrix resin through the channel 45 between the sleeves 36, restrictor bars 78 are provided on the walls defining the die chamber 18 to constrict the channels 47 between the sleeves 36 and the large central portion 30 of the die chamber 18. The restrictor bars 78 are conveniently adjustable by means of threaded bolts or the like to permit movement to varying levels within the channel 47.

Turning now to operation of the apparatus, fluid synthetic thermoplastic resin from the main extruder 10 is fed through the feed conduit 20 to the manifold 28 and thence into the upstream portion of the die chamber 18. The resin is then caused to flow about the surfaces of the sleeves 36 through the channels 45, 47.

Simultaneously, differentially colored fluid synthetic thermoplastic resin is fed from the crosshead extruder 12 through the feed conduit 22 to the feed bores 48 of the sleeves 36. The resin then flows at a relatively uniform rate through the series of apertures 56 into the feed passages 52 to the large diameter bores 50. The screws 60 rotating within the large diameter bores 50 discharge the fluid synthetic thermoplastic resin on an intermittent basis through the discharge openings 58a, 58b alternately in each of the sleeves 36, thus producing a discharge of resin which progresses along the length of the discharge openings 58a, 58b.

The flow diverter 62 and the flow diverter bars 80 deflect the matrix resin flowing through the channels 45, 47 into the discharger openings 58a, 58b so as to encapsulate the differentially colored resin issuing therethrough. In this manner, the differentially colored resin is completely encapsulated within the main stream of the matrix resin and smearing is avoided. Moreover, the diverted matrix resin passing into the discharge openings 58 facilitates the removal of the differentially colored resin therefrom. As a result, the composite stream of thermoplastic resin issuing from the die lips 27 contains the differentially colored thermoplastic in two vertically spaced layers spaced from either outer surface thereof.

Typical sheet material which may be produced in accordance with the apparatus previously described is illustrated in FIGS. 13 and 14 of the accompanying drawings. The plan view, FIG. 13, shows the pulsed bands of color 86 from the upper sleeve 36 and the pulsed bands of color 88 from the lower sleeve 36, both extending diagonally to the center line of the sheet material and crossing each other at various points to produce a basketweave pattern. As can be seen, the beginning and end of the short bands of color extend somewhat parallel to the direction of extrusion because of the variation in the rate of flow of the resin through the discharge openings 58 as the helical lands of the screw to begin to open or to close resin fed in any particular discharge opening 58. The sectional view, FIG. 14, illustrates the disposition of the differentially colored bands within the matrix resin.

Figure 12:
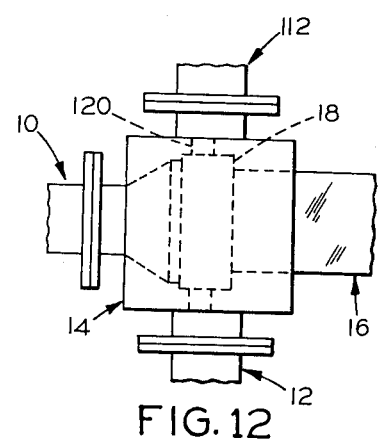
FIG. 12 is a fragmentary plan view of an extruder assembly embodying the present invention and adapted to produce three color sheet material.

Turning now to FIG. 12 of the attached drawings, therein illustrated is an alternate embodiment of the apparatus of the present invention adapted to produce a three color extruded sheet material. To avoid repetition, the same numerals are employed with respect thereto as were employed with respect to the embodiment of FIGS. 1–10. In this embodiment, a second crosshead extruder generally designated by the numeral 112 feeds differentially colored thermoplastic resin to the feed conduit 120 at the side of the die block 14 opposite which the extruder 12 is connected. In this manner, the crosshead extruders 12, 112 each feed one of the sleeves 36 so that the differentially colored bands produced by the two sleeves, i.e., the two layers of differentially colored material, will be of different colors. In this manner, the bands extending in one direction differ in color from the bands extending in the opposite direction.

Figure 15:
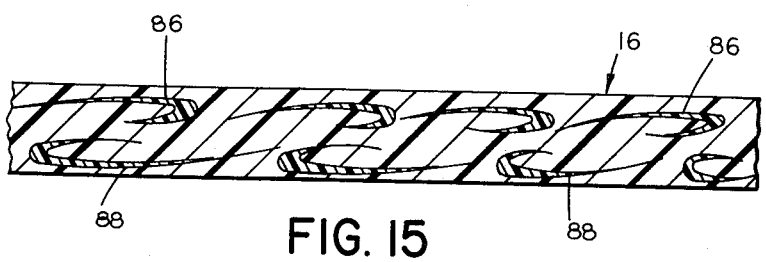
FIG. 15 is a plan view of another embodiment of sheet material produced in accordance with the present invention.

In the embodiment of FIGS. 13 and 14, the screws 60 in the sleeves 36 are both turning at about the same speed and in opposite directions. In FIG. 15, there is illustrated an alternate embodiment of sheet material which may be produced in accordance with the present invention. The sheet material generally designated by the numeral 116 has a series of elongated bands 186 produced by discharge of the differentially colored synthetic thermoplastic resin through the discharge openings 58a, 58b of one sleeve 36 by the screw 60 which is operating at a very slow rate of rotation. The generally transversely extending short bands of color 188 are produced by discharge of the differentially colored resin through the discharge openings 58 by a screw 60 operating at a relatively high rate of rotation.

Various patterns may be obtained by using different combinations of screws or other intermittent discharge means such as paddle shaped members which will discharge across the entire surface of the discharge openings 58 simultaneously, by varying the relative rates of speed of the intermittent discharge means, by varying their direction of rotation, by oscillating their speed of rotation, etc. Adjustments in the matrix resin flow are conveniently adjusted not only by the pressure developed in the extruder 10 but also by variation in the flow restriction caused by the adjustable restrictor bars 78.

Turning now to FIG. 11, therein illustrated is another embodiment of pressure compensating means comprising a tapered plug generally designated by the numeral 86 and increasing in diameter from the feed conduit end A to the opposite and B. In this manner, the feed bore 48 in the sleeves 36 are constricted as the resin volume decreases to compensate for pressure drop and maintain substantially uniform flow into the feed passage 52 along the length of the bores.

In yet another embodiment, the pressure compensating means may be provided by a slot in a tubular insert in the feed bore which increases in width from the feed conduit end to the opposite end by milling the feed passage 52 to provide increasing width with increasing distance from the additional feed conduit 22.

The diverter bars may be mounted on the sleeves, or on the walls of the die chamber, or carried by seating end portions in the die block. The restrictor bars are conveniently adjustably mounted in the die block although they may be fixed to the walls of the die chamber or to the sleeves.

Although configurations of the die chamber and sleeves may vary from that illustrated, this particular crossection has been found highly advantageous in avoiding stagnant areas and in ensuring optimum encapsulation of the differentially colored resin. It is essential that the adjacent surfaces be streamlined and permit non-turbulent flow of resin thereby.

As will be readily appreciated, the novel die block assembly required for the method of the present invention may be fabricated from relatively few parts and is simple to construct and to maintain while at the same time ensuring trouble-free operation. Variations in pattern and color may be readily effected and the resultant patterns are substantially uniform along the length of the sheet material and are relatively free from smearing.

Having thus described the invention, I claim:

1. In a method for fabricating synthetic thermoplastic sheet material having differentially colored bands therein extending along the length thereof, the steps comprising:
   a. providing an elongated die chamber having an extrusion orifice and a discharge passage communicating therebetween;
   b. supplying fluid synthetic thermoplastic resin to said die chamber at a point spaced from said discharge passage;
   c. supplying a differentially colored fluid synthetic thermoplastic resin at a multiplicity of points in said die chamber spaced along the length thereof and between the point of supply of the first mentioned fluid synthetic plastic resin and said discharge passage, said points being spaced above and below the center line of said die chamber, said resin being supplied intermittently at said spaced points to produce pulses of color at said spaced points, said points of supply being cyclically moved a limited distance along the length of said die chamber;
   d. controlling the flow of differentially colored resin to said spaced points to provide substantially uniform amounts to said spaced points along the length thereof, said step of controlling the flow compensating for any pressure drop along the length of said die chamber through which said points of supply are disposed;
   e. causing said first mentioned resin to flow above and below said spaced points of introduction of said differentially colored resin and to flow towards said points of supply to encapsulate said differentially colored resin at said points of supply; and
   f. extruding a composite stream wherein said differentially colored synthetic thermoplastic resin is encapsulated within a matrix of said first mentioned synthetic thermoplastic resin, the movement of said spaced points of supply along the length of said chamber above said chamber line being in a direction opposite to that of the points below said center line whereby said differentially colored synthetic thermoplastic resin provides intersecting bands of differential color along the length of the extruded composite stream.

2. The method in accordance with claim 1 wherein the points of supply of said differentially colored fluid synthetic thermoplastic resin are helically moved a limited distance along the length of said die chamber.

3. The method in accordance with claim 2 wherein the direction of helical movement of the points of supply above the center line of said die chamber is opposite to the direction of helical movement of the points below the center line of said die chamber.

4. The method in accordance with claim 2 wherein the speed of the helical movement of said points of supply above said center line of said die chamber differs from the speed of the helical movement of the points below said center line of said die chamber.

5. The method in accordance with claim 1 wherein the differentially colored fluid synthetic thermoplastic resin supplied at the points above said center line is of a first differential color and that supplied below said center line of said die chamber is of a second differential color, thereby producing a three-color synthetic plastic material having intersecting bands of two different colors.

6. The method in accordance with claim 2 wherein the helical movement of the points of supply above the center line of the die chamber is at a rate different from that of the points of supply below said center line.

7. The method in accordance with claim 1 wherein the resin supplied to said spaced points is of substantially equal volume.

8. The method in accordance with claim 1 wherein said spaced points above and below said center line of said die chamber are each arranged in at least two rows above and at least two rows below said center line.

9. The method in accordance with claim 8 wherein said spaced points in said rows above said center line and said spaced points in said rows below said center line are staggered.

* * * * *

UNITED STATES PATENT AND TRADEMARK OFFICE
CERTIFICATE OF CORRECTION

PATENT NO. : 3,914,362
DATED : October 21, 1975
INVENTOR(S) : Robert E. Randall

It is certified that error appears in the above-identified patent and that said Letters Patent are hereby corrected as shown below:

Column 8, line 33, "chamber", second occurrence, should read -- center --.

Signed and Sealed this sixteenth Day of March 1976

[SEAL]

Attest:

RUTH C. MASON
Attesting Officer

C. MARSHALL DANN
Commissioner of Patents and Trademarks